United States Patent [19]

Thomas et al.

[11] 4,366,283

[45] Dec. 28, 1982

[54] POLYCARBONATE CONTAINING A METAL SALT OF A PERHALOMETALATE AS AN IGNITION DEPRESSANT

[75] Inventors: Lowell S. Thomas; Ronald V. Petrella, both of Midland, Mich.

[73] Assignee: The Dow Chemical Company, Midland, Mich.

[21] Appl. No.: 93,649

[22] Filed: Nov. 13, 1979

[51] Int. Cl.$^3$ ............................................... C08L 3/16
[52] U.S. Cl. ................................................... 524/413
[58] Field of Search ................ 260/45.75 R, 45.75 C, 260/45.75 P, 45.75 N, 45.75 F; 525/4; 252/8.1; 524/413

[56] References Cited

U.S. PATENT DOCUMENTS

| | | | |
|---|---|---|---|
| 2,658,882 | 11/1953 | Maneri | 260/37 |
| 3,634,311 | 1/1972 | Peterson et al. | 260/45.75 F |
| 3,775,367 | 11/1973 | Nouvertne | 260/45.9 R |
| 3,836,490 | 9/1974 | Bockmann et al. | 260/18 TN |
| 3,876,580 | 4/1975 | Nouvertne et al. | 260/37 PC |
| 3,909,489 | 9/1975 | Callander | 260/45.7 R |
| 4,093,589 | 6/1978 | Factor et al. | 260/45.75 G |
| 4,105,633 | 8/1978 | Swart et al. | 528/176 |
| 4,208,489 | 6/1980 | Schmidt et al. | 260/45.75 F |

FOREIGN PATENT DOCUMENTS

| | | |
|---|---|---|
| 2013496 | 9/1971 | Fed. Rep. of Germany . |
| 2212718 | 3/1972 | Fed. Rep. of Germany . |
| 2800923 | 7/1978 | Fed. Rep. of Germany . |
| 2703710 | 8/1978 | Fed. Rep. of Germany . |
| 7800954 | 1/1978 | Netherlands . |
| 1273071 | 5/1972 | United Kingdom . |
| 1370744 | 10/1974 | United Kingdom . |
| 1385399 | 2/1975 | United Kingdom . |

OTHER PUBLICATIONS

CA 83 116859e (1975).
Modern Plastics–Oct. 1970, pp. 92 to 96, 98, Howard Reymers.
Testing of Polymers–vol. 2, pp. 349-360, 1966, Allen et al.

*Primary Examiner*—V. P. Hoke

[57] ABSTRACT

A polycarbonate such as a bisphenol-A homopolycarbonate containing a small amount of a metal salt of a perhalometalate complex, e.g., the potassium salt of perfluorotitanate, resists combustion upon exposure to a low temperature ignition source.

8 Claims, No Drawings

POLYCARBONATE CONTAINING A METAL SALT OF A PERHALOMETALATE AS AN IGNITION DEPRESSANT

DESCRIPTION OF THE INVENTION

This invention relates to polycarbonates containing additives which inhibit combustion upon exposure of the polycarbonates to low temperature ignition sources.

Polycarbonates derived from reactions of dihydroxyorganic compounds, particularly the dihydric phenols, and carbonic acid derivatives such as phosgene have found extensive commercial application because of their excellent physical properties. These thermoplastic polymers appear to be particularly suitable for the manufacture of molded parts wherein impact strength, rigidity, toughness, heat resistance and excellent electrical properties are required.

Unfortunately, however, these polymers exhibit a brief but definite burning time when contacted with an open flame or comparable low temperature ignition source. More importantly, as is often the case, the polycarbonates contain stabilizers and other additives which are often more combustible than the unmodified polycarbonate. As a result, the modified polycarbonate frequently exhibits substantially poorer resistance to combustion than does the unmodified polycarbonate.

In attempts to increase the combustion resistance of polycarbonates including modified forms thereof, it has been a common practice to employ monomeric phosphites, phosphoric acid esters, thiophosphoric acid esters containing halogenated alkyl radicals and halogenated organic compounds into the polycarbonate. However, in order to obtain any noticeable improvement in combustion resistance, these additives have been employed in such large quantities that they often adversely affect many of the desirable physical and mechanical properties of the polycarbonate.

More recently, for example as taught in U.S. Pat. No. 3,919,167, various organo sulfonate salts have been employed as fire retardant additives for the polycarbonates. While these materials do not have a substantial deleterious effect on the physical properties of the polycarbonate, they generally must be employed in concentrations of at least one weight percent based on the polycarbonate in order to obtain a material that does not exhibit flaming drips upon combustion in accordance with Underwriter's Lab Standard Test UL-94.

In view of the deficiencies of conventional fire retardant polycarbonate compositions, it would be highly desirable to provide a polycarbonate composition having improved resistance to burning when exposed to a low temperature ignition source.

SUMMARY OF THE INVENTION

The present invention is a polycarbonate composition comprising a carbonate polymer having dispersed therein a metal salt of a perhalometalate complex wherein the metal of the metalate is transition metal (hereinafter this salt shall be called perhalate salt). The perhalate salt is present in an amount sufficient to retard combustion when the composition is exposed to a low temperature ignition source. Hereinafter, such composition shall be referred to as a fire retardant polycarbonate. The fire retardant polycarbonate of the present invention exhibits surprisingly high resistance to combustion and physical properties comparable to the carbonate polymer containing no perhalate salt.

The fire retardant polycarbonate of the present invention is suitably employed in most applications in which polycarbonates have been previously utilized. Applications of particular interest for the utilization of the fire retardant polycarbonates of this invention are as follows: automobile parts, e.g., air filters, fan housings, exterior components; housings for electrical motors, appliances, business and office equipment, photographic equipment, electrical switch boxes, electronic components, lighting and aircraft applications.

In general, such fire retardant polycarbonates are particularly useful in applications wherein the polycarbonate part is likely to be exposed to low temperature ignition sources.

DETAILED DESCRIPTION OF THE EMBODIMENTS

The carbonate polymers employed in the present invention are advantageously aromatic carbonate polymers such as the trityl diol carbonates described in U.S. Pat. No. 3,036,036; 3,036,037; 3,036,038 and 3,036,039; polycarbonates of bis(ar-hydroxyphenyl)alkylidenes (often called bisphenol-a type diols) including their aromatically and aliphatically substituted derivatives such as disclosed in U.S. Pat. Nos. 2,999,835; 3,038,365 and 3,334,154; and carbonate polymers derived from other aromatic diols such as described in U.S. Pat. No. 3,169,121.

It is understood, of course, that the carbonate polymer may be derived from two or more different dihydric phenols or a copolymer of a dihydric phenol with a glycol or with a hydroxy or acid terminated polyester or with a dibasic acid in the event that a carbonate copolymer or interpolymer rather than a homopolymer is desired. Also suitable for the practice of this invention are blends of any one of the above carbonate polymers. Also included in the term "carbonate polymer" are the ester carbonate copolymers of the types described in U.S. Pat. Nos. 3,169,121, e.g., a copolyester of a dihydric phenol, a dicarboxylic acid and carbonic acid wherein the copolyester has recurring carbonate groups

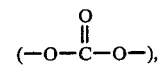

carboxylate groups

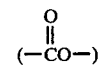

and aromatic carbocylic groups in a linear polymer chain provided that at least some of the carboxylate groups and at least some of the carbonate groups are bonded directly to ring carbon atoms of the aromatic carbocyclic groups and 4,105,633, e.g., a normally solid, alternating copolyestercarbonate consisting essentially of repeating units of the formula:

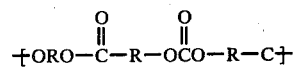

wherein each R is independently aromatic hydrocarbylene or inertly substituted aromatic hydrocarbylene. Of the aforementioned carbonate polymers, the polycarbonates of bisphenol-A and derivatives, including copolycarbonates of bisphenol-A, are preferred. Methods for preparing carbonate polymers for use in the practice of this invention are well known, for example, several suitable methods are disclosed in the aforementioned patents which are hereby incorporated by reference in their entirety.

While any of the metal salts of perhalotransition metalates are suitably employed in the practice of this invention, preferred perhalate salts are those represented by the formula:

$$M_yM'X_z$$

wherein M is alkali metal; M' is a transition metal; X is fluoro, chloro or bromo; z is a whole number which corresponds to the coordination number of M', e.g., 4, 5, 6, 7, 8 or 9; and y is a whole number equal to the valence of $M'X_z$. More preferably, M is sodium or potassium, M' is a Group IV B or Group V B metal of Mendeleef's Periodic Table of Elements such as Ti, Zr, Nb or Ta; X is fluoro and z is 6 or 7. Exemplary most preferred perhalate salts include $K_2TiF_6$ (potassium hexafluorotitanate), $K_2ZrF_6$, $KNbF_6$, $K_2NbF_7$ and $K_2TaF_7$. Other preferred perhalate salts include $K_2NiF_6$, $Na_3FeF_6$, $K_2PtBr_6$, $Na_2PdCl_4$, $KVF_6$, $Na_3HfF_7$, $K_3W_2Cl_9$, $K_2Re_2Cl_8$, $K_2CuF_4$ and $K_2WF_8$. The perhalate salts are employed in particulate or powder form wherein the average particle diameter is preferably less than 5 micrometers, most preferably, less than one micrometer.

Methods for preparing the perhalate salts suitable employed in the practice of this invention are described in Kirk-Othmer Encyclopedia of Chemical Technology, 2nd Ed., Interscience Publishers, New York; J. H. Simons, Fluorine Chemistry, Vol. I, Academic Press, New York (1952); and R. Colton et al., Halides of the Transition Elements-Halides of the First Row Transition Metals, Wiley-Interscience, New York (1969).

The fire retardant polycarbonate of the present invention is suitably prepared by combining the carbonate polymer with an effective amount of perhalate salt using any one of a variety of blending procedures conventionally employed for incorporating additives into carbonate polymer resins. For example, dry particulates of the carbonate polymer and the perhalate salt may be dry blended and the resulting dry blend extruded into the desired shape.

While any amount of perhalate salt that imparts to the polycarbonate an improved resistance to ignition and/or combustion is suitable, preferred amounts of the perhalate salt are in the range from about 0.001 to about 2, especially from about 0.01 to about 0.5, weight percent based on the weight of the polycarbonate.

In addition to the aforementioned perhalate salts, other additives may be included in the fire retardant polycarbonate of the present invention such as other fire retardant additives, fillers, pigments, dyes, antioxidants, stabilizers, ultraviolet light absorbers, mold release agents and other additives commonly employed in polycarbonate resin formulations.

The following examples are given to further illustrate the invention and should not be construed as limiting its scope. In the following examples, all parts and percentages are by weight unless otherwise indicated.

EXAMPLE 1

To a 10,000-g sample of a homopolycarbonate of bisphenol-A, having a weight average molecular weight ($M_w$) of 32,000 as determined by gel permeation chromatography and sold under the trade name Merlon M50F-1000 by Mobay Chemical, in the form of pellets (0.32 cm (dia)×0.32 cm (length)) is added 0.5 g of the potassium salt of perfluorotitanate ($K_2TiF_6$). These ingredients are dry blended and then dried at 250° F. for 4 hours. The resultant blend is extruded and repelletized in a single screw extruder equipped with a static mixer and operating at 525° F. The extruded pellets are re-dried at 250° F. for up to 4 hours. These redried pellets are molded into test bars (12.7 cm × 1.27 cm × 0.32 cm) using a screw type injection molding unit wherein the molding temperature is 575° F. The injection molded bars are tested for combustibility (oxygen index and fire retardance) and for optical properties (light transmission, haze and yellowness index). The results of these tests (Sample No. 1) are reported in Table I.

For the purposes of comparison, three additional blends (Sample Nos. 2-4) are prepared using different amounts of $K_2TiF_6$. These blends are also tested and the results are reported in Table I. Also recorded in Table I are the combustibility and optical properties of a control sample (Sample No. C) employing no fire retardant additive.

TABLE I

| Sample No. | Perhalte Salt Amount(1), % | O2 Index(2) % O2 | Flame Retardance(3) Flame Time, sec. | Rating | Light Transmission(4), % | Haze(5) % | YI(6) |
|---|---|---|---|---|---|---|---|
| 1 | 0.005 | 31.8 | 6.8 | V-2,V-2 | 87.9 | 6.6 | 4.8 |
| 2 | 0.020 | 36.0 | 3.8 | V-0,V-2 | 87.1 | 7.5 | 6.3 |
| 3 | 0.050 | 36.1 | 3.7 | V-0,V-0 | 85.8 | 19.3 | 7.1 |
| 4 | 0.200 | 33.3 | 5.4 | V-1,V-1 | 81.3 | 64.6 | 10.2 |
| C* | — | 25.2 | 17.5 | HB,HB | 88.8 | 2.3 | 4.7 |

*Not an example of the invention.
(1)Amount - weight percent based on polycarbonate
(2)ASTM D-2863-70
(3)Underwriters Laboratories Standard Test UL-94
(4)ASTM D-1003-61
(5)ASTM D-1003-61
(6)ASTM D-1925-70

As evidenced by the data shown in Table I, the perhalate salts such as $K_2TiF_6$ impart significant fire retardance to polycarbonates even at low levels, e.g., 0.005-0.02%, wherein optical properties are not significantly affected.

EXAMPLE 2

To a 3000-g portion of the polycarbonate used in Example 1 is added 3 g of potassium perfluorozirconate ($K_2ZrF_6$) in the form of a dry powder.

These ingredients are dry blended, dried, extruded, repelletized, redried and injection molded into test bars by the procedures described in Example 1. Also, following the procedure of Example 1, the resulting test bars are tested for oxygen index and flame retardance. The results of these tests are reported in Table II. Also, for purposes of comparison, different amounts of $K_2ZrF_6$ and other perhalate salts, as indicated in Table II, are similarly tested. A control sample (Sample No. C) containing no perhalate salt is similarly tested. The results of these tests are also reported in Table II.

TABLE II

| Sample No. | Perhalate Salt Type | Amount[1], % | $O_2$ Index[2], % $O_2$ | Fire Retardance[3] Avg. Flame Time, Sec | Rating 2 Tests |
|---|---|---|---|---|---|
| C* | None | — | 25.2 | 17.5 | HB,HB |
| 1 | $Z_2ZrF_6$ | 0.1 | 35.0 | 3.9 | V-0,V-0 |
| 2 | " | 1.0 | 31.6 | 6.1 | V-1,V-1 |
| 3 | $K_2NiF_6$ | 0.01 | 35.4 | 5.3 | V-0,V-2 |
| 4 | " | 0.05 | 33.3 | 7.5 | V-2,V-2 |
| 5 | " | 0.20 | 29.0 | 5.1 | V-1,V-2 |
| 6 | $K_2MoCl_6$ | 0.01 | 29.2 | 1.7 | V-2,V-2 |
| 7 | " | 0.05 | 31.5 | 3.4 | V-2,V-2 |
| 8 | " | 0.1 | 31.5 | 3.1 | V-2,V-2 |
| 9 | $K_2PtBr_6$ | 0.05 | 38.9 | 1.8 | V-0,V-0 |
| 10 | " | 0.1 | 41.0 | 1.1 | V-0,V-0 |
| 11 | $Na_2PdCl_4$ | 0.01 | 32.4 | 5.1 | V-2,V-2 |
| 12 | " | 0.05 | 35.0 | 2.8 | V-0,V-0 |
| 13 | " | 0.1 | 37.4 | 2.6 | V-0,V-0 |
| 14 | $K_2TiF_6$ | 0.02 | 36.0 | 3.8 | V-0,V-2 |
| 15 | " | 0.03 | 37.6 | 3.4 | V-0,V-0 |
| 16 | " | 0.05 | 36.1 | 3.7 | V-0,V-0 |
| 17 | " | 0.2 | 33.3 | 5.4 | V-1,V-1 |

As evidenced by the data of Table II, the transition metal perhalate salts exhibit excellent flame retardant characteristics at low concentrations of the salt. However, some of the flame retardant characteristics are lost as concentrations of such salts are increased, e.g., above 0.1 weight percent based on polycarbonate.

What is claimed is:

1. A composition consisting essentially of an aromatic carbonate polymer having dispersed therein a metal salt of a perhalometalate in an amount of about 0.1 weight percent based on the polymer or less which amount is sufficient to retard combustion when the composition is exposed to a low temperature ignition source, said metal salt being represented by the formula:

$$M_yM'X_z$$

wherein M is alkali metal; M' is a transition metal; X is fluoro, chloro or bromo; z is a whole number which corresponds to the coordination number of M'; and y is a whole number equal to the valence of $M'X_z$, provided that when the metal salt is $K_2TiF_6$ it is present in an amount from about 0.02 to about 0.05 weight percent based on the polymer, said composition having Underwriter's Laboratories' (UL-94) flame retardance rating of V-1 or V-0 as determined using a test bar having the following dimensions: 12.7 cm×1.27 cm×0.32 cm.

2. The composition of claim 1 wherein M is Na or K; M' is Ti or Zr; X is fluoro or bromo; z is 6 or 7 and y is 1 or 2.

3. The composition of claim 2 wherein the metal salt is $K_2TiF_6$.

4. The composition of claim 1 wherein the polymer is a carbonate homopolymer or copolymer derived from a dihydric phenol.

5. The composition of claim 1 wherein the polymer is a polycarbonate of a bis(ar-hydroxyphenyl)alkylidene.

6. The composition of claim 5 wherein the bis(ar-hydroxyphenyl)alkylidene is bisphenol-A.

7. The composition of claim 1 wherein the polymer is a copolyester of a dihydric phenol, a dicarboxylic acid and carbonic acid wherein the copolyester has recurring carbonate groups $$(-O-\overset{\overset{\displaystyle O}{\|}}{C}-O-),$$

carboxylate groups $$(-\overset{\overset{\displaystyle O}{\|}}{C}O-)$$

and aromatic carbocylic groups in a linear polymer chain provided that at least some of the carboxylate groups and at least some of the carbonate groups are bonded directly to ring carbon atoms of the aromatic carbocyclic groups.

8. The composition of claim 1 wherein the aromatic carbonate polymer is an alternating copolyester carbonate consisting essentially of repeating units of the formula:

$$\pmb{+}ORO-\overset{\overset{\displaystyle O}{\|}}{C}-R-O\overset{\overset{\displaystyle O}{\|}}{C}O-R-\overset{\overset{\displaystyle O}{\|}}{C}\pmb{+}$$

wherein each R is independently aromatic hydrocarbylene.

* * * * *